United States Patent
Alasirnio et al.

(10) Patent No.: US 10,101,555 B2
(45) Date of Patent: Oct. 16, 2018

(54) CAMERA MODULE INCLUDING A NON-CIRCULAR LENS

(71) Applicant: Heptagon Micro Optics Pte. Ltd., Singapore (SG)

(72) Inventors: Jukka Alasirnio, Jääli (FI); Hartmut Rudmann, Jona (CH); Mario Cesana, Au (CH); Stephan Heimgartner, Aarau Rohr (CH)

(73) Assignee: Heptagon Micro Optics Pte. Ltd., Singapore (SG)

( * ) Notice: Subject to any disclaimer, the term of this patent is extended or adjusted under 35 U.S.C. 154(b) by 0 days.

(21) Appl. No.: 14/905,391

(22) PCT Filed: Jul. 16, 2014

(86) PCT No.: PCT/SG2014/000334
§ 371 (c)(1),
(2) Date: Jan. 15, 2016

(87) PCT Pub. No.: WO2015/009237
PCT Pub. Date: Jan. 22, 2015

(65) Prior Publication Data
US 2016/0154198 A1 Jun. 2, 2016

Related U.S. Application Data

(60) Provisional application No. 61/847,146, filed on Jul. 17, 2013, provisional application No. 61/975,999, filed on Apr. 7, 2014.

(51) Int. Cl.
*H04N 5/225* (2006.01)
*G02B 7/02* (2006.01)
*G03B 17/02* (2006.01)
*G03B 29/00* (2006.01)

(52) U.S. Cl.
CPC ............... *G02B 7/021* (2013.01); *G02B 7/02* (2013.01); *G03B 17/02* (2013.01); *G03B 29/00* (2013.01); *H04N 5/225* (2013.01); *H04N 5/2254* (2013.01); *H04N 5/2257* (2013.01)

(58) Field of Classification Search
CPC ............................ G02B 7/021; G02B 13/0055
See application file for complete search history.

(56) References Cited

U.S. PATENT DOCUMENTS

| | | | | |
|---|---|---|---|---|
| 5,184,223 A | * | 2/1993 | Mihara | G02B 13/08 348/207.99 |
| 5,680,260 A | * | 10/1997 | Farcella | G02B 7/022 359/818 |
| 5,748,390 A | | 5/1998 | Koiwai et al. | |

(Continued)

FOREIGN PATENT DOCUMENTS

CN 2624231 7/2004

OTHER PUBLICATIONS

Australian Patent Office, International Search Report and Written Opinion, issued by ISA/AU in International Patent Application No. PCT/SG2014/000334 (dated Dec. 15, 2014).

*Primary Examiner* — Gary C Vieaux
(74) *Attorney, Agent, or Firm* — Fish & Richardson P.C.

(57) ABSTRACT

Camera modules include a lens, a lens stack and/or an array of lenses. One or more of the lenses have a non-circular shape, which in some cases can provide greater flexibility in the dimensions of the module and can result in a very small camera module.

16 Claims, 7 Drawing Sheets

(56) References Cited

U.S. PATENT DOCUMENTS

| | | | |
|---|---|---|---|
| 6,157,501 A * | 12/2000 | Sato | G02B 7/02 |
| | | | 359/811 |
| 6,341,901 B1 | 1/2002 | Wasa et al. | |
| 7,446,964 B2 | 11/2008 | Chang | |
| 8,184,195 B2 * | 5/2012 | Duparre | H01L 27/14618 |
| | | | 348/340 |
| 9,153,614 B2 * | 10/2015 | Tuttle | H01L 27/14627 |
| 9,491,362 B2 * | 11/2016 | Hu | H04N 5/2254 |
| 2004/0008428 A1 * | 1/2004 | Fang | G02B 7/02 |
| | | | 359/819 |
| 2010/0253832 A1 * | 10/2010 | Duparre | H01L 27/14618 |
| | | | 348/360 |
| 2010/0265597 A1 * | 10/2010 | Shyu | C03B 11/08 |
| | | | 359/797 |
| 2012/0182629 A1 * | 7/2012 | Seo | G02B 7/021 |
| | | | 359/811 |
| 2012/0288272 A1 * | 11/2012 | Pavithran | G03B 17/12 |
| | | | 396/529 |
| 2013/0258044 A1 * | 10/2013 | Betts-Lacroix | H04N 13/0242 |
| | | | 348/36 |
| 2013/0287383 A1 * | 10/2013 | Haruguchi | G03B 3/10 |
| | | | 396/133 |
| 2015/0103417 A1 * | 4/2015 | Nomura | G02B 13/005 |
| | | | 359/733 |

* cited by examiner

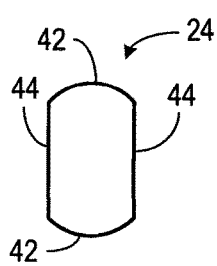 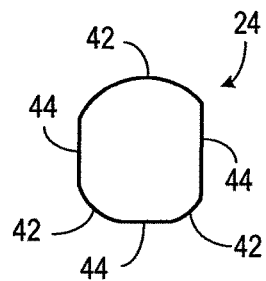 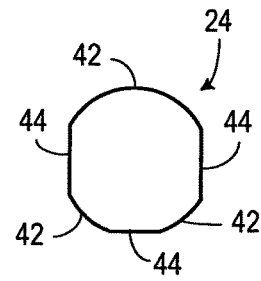 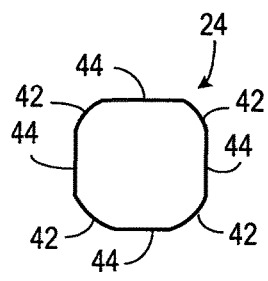
FIG. 3D        FIG. 3E        FIG. 3F        FIG. 3G
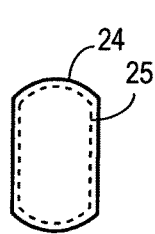 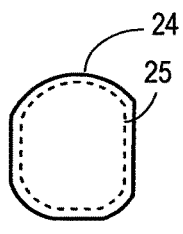 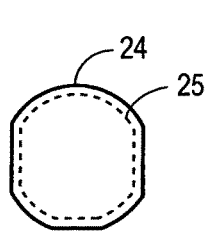 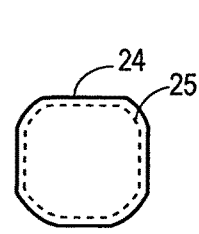
FIG. 4A        FIG. 4B        FIG. 4C        FIG. 4D
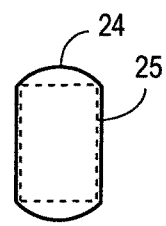 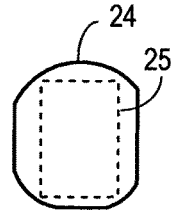 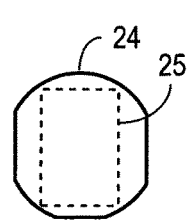 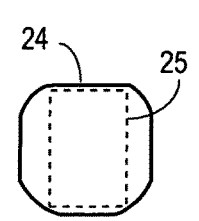
FIG. 5A        FIG. 5B        FIG. 5C        FIG. 5D

CAMERA MODULE INCLUDING A NON-CIRCULAR LENS

FIELD OF THE DISCLOSURE

This disclosure relates to camera modules including a non-circular lens.

BACKGROUND

Camera modules such as still camera modules and digital camera modules can be combined with a wide range of electronic devices. Some camera modules include a lens module and an image sensor module aligned with one another. In some cases, the lens module includes a lens barrel, and one or more lenses assembled in the lens barrel.

The lens barrel may be held within a mount and rotated so as to move the lens barrel closer to or away from the image sensor. To facilitate such movement of the lens barrel, inner threads (e.g., on the inner surface of the mount) engage with threads on the outer surface of the lens barrel.

An example of such a module is illustrated in FIG. 1A and includes multiple lenses 10A, 10B, 10C. If the focus length of the lens stack deviates from a desired value, it can be adjusted by moving the lens barrel 16 vertically within the mount 18 along the z-axis. Even though the image sensor 12 and its active array area 14 generally have a rectangular shape when viewed along the z-axis, circular lenses 10A, 10B, 10C are used to facilitate focusing of light passing through the lenses onto the image sensor 12 (see FIG. 1B).

OVERVIEW

The present disclosure describes various camera modules that include a lens, a lens stack (i.e., vertically stacked lenses) and/or an array of lenses. In some implementations, although the optically active part of each lens is rotationally symmetric, one or more of the lenses can have a non-circular shape, which in some cases can provide greater flexibility in the dimensions of the module and can result in a very small camera module. The lenses can be made, for example, by injection molding, which allows the lenses to be made in a wide range of shapes depending on the particular design requirements of the module. The lenses also can be made by a wafer-level replication technique. For example, the lenses can be replicated in a circular shape and then cut (e.g., by dicing) to match the dimensions of the active array area. In some implementations, a non-circular lens can be combined with circular lenses in a lens stack.

According to one aspect, for example, a camera module includes an image sensor having an active array region, a lens that has a non-circular shape when viewed along an axis that is perpendicular to a surface of the active array region, and a focal length correction means that separates the lens from the image sensor.

In another aspect, a camera module includes an image sensor having active array regions, an array of lenses, wherein each lens and a corresponding one of the active array regions defines a respective optical channel, and focal length correction means that separates the array of lenses from the image sensor. In some implementations, the lenses in the array can have a non-circular shape when viewed along an axis that is perpendicular to a plane of the active array regions.

According to yet a further aspect, a camera module includes an image sensor having an active array region, and a lens stack, wherein at least one lens in the lens stack has a non-circular shape when viewed along an axis that is perpendicular to a plane of the active array region. The module further includes a plate that is transparent to wavelengths of light that are detectable by the image sensor, a first spacer separating the plate from the lens stack, and a second spacer separating the plate form the image sensor.

In accordance with another aspect, a camera module includes a lens stack and an image sensor having an active array region. The lens stack includes a lens that has a non-circular shape when viewed along an axis that is perpendicular to a surface of the active array region, and a second lens that is disposed over the lens having the non-circular shape, wherein the second lens has smaller dimensions than the lens having the non-circular shape. The module also includes a focal length correction means that separates the lens stack from the image sensor.

Other aspects, features and advantages will be readily apparent from the following detailed description, the accompanying drawings and the claims.

BRIEF DESCRIPTION OF THE DRAWINGS

FIGS. 3A through 3G illustrate examples of non-circular lenses.

FIGS. 4A through 4D illustrate the outlines of examples of non-circular lens barrels combined with non-circular lenses.

FIGS. 5A through 5D illustrate further examples of the outlines of non-circular lens barrels combined with non-circular lenses.

DETAILED DESCRIPTION

Figure 2:
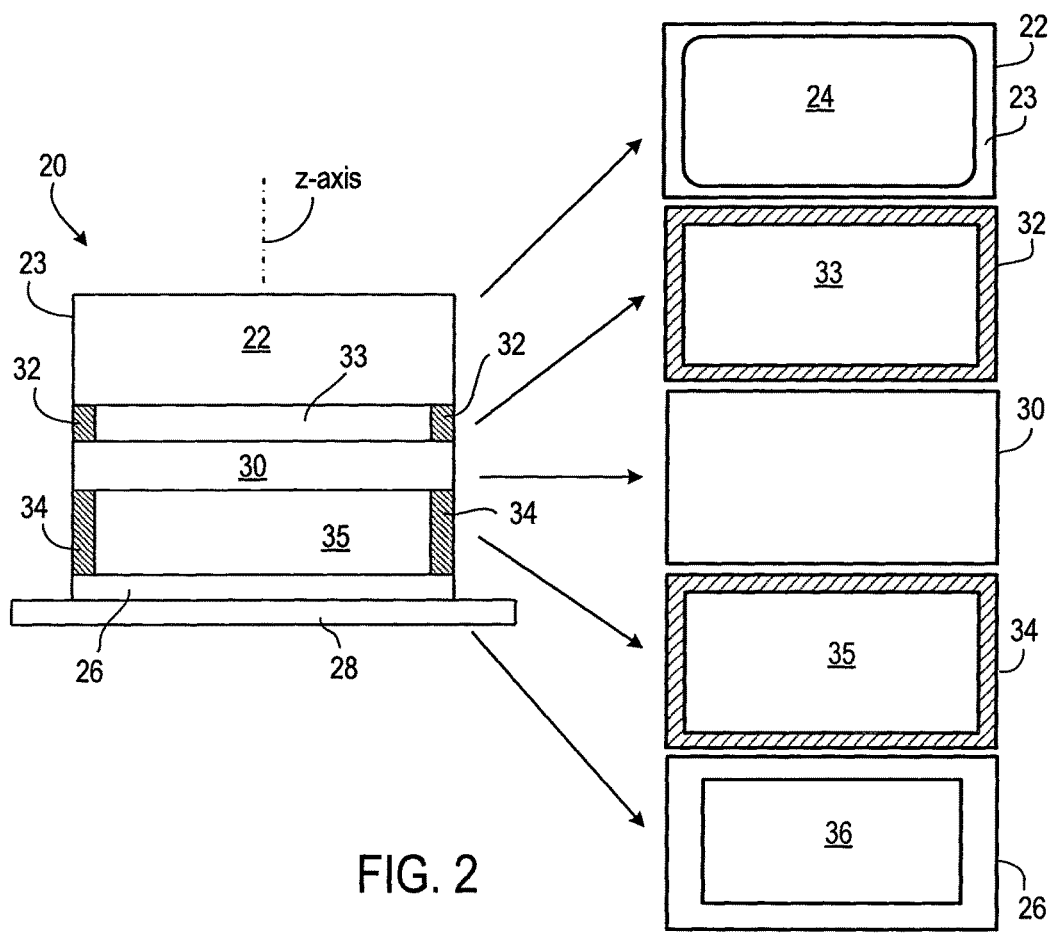
FIG. 2 illustrates an example of a camera module.

As shown in FIG. 2, a camera module 20 includes a lens stack 22 that has one or more vertically stacked lenses, at least one of which (e.g., the largest lens 24) has a non-circular shape when viewed along the z-axis (see the right-hand side of FIG. 2, which shows top views of particular components of module 20). The lenses can be composed, for example, of glass (e.g., diamond turned. molded or polished), plastic or polymer material. Camera module 20 includes an image sensor 26 mounted on a printed circuit (PCB) or other substrate 28. Image sensor 26 can be, for example, a charge coupled device (CCD) or a complementary metal oxide semiconductor transistor (CMOS). Image sensor 26 has an active array portion 36. A transparent substrate 30 composed, for example, of glass or a polymer material, is located between lens stack 22 and sensor 26. The thickness of transparent substrate 30 can be chosen to provide focal length correction (e.g., flange focal length (FFL)) for the optical channel during assembly of the camera module. Thus, the transparent substrate 30 can serve as a focal length correction means.

By integrating focal length correction means into the module, the need for a rotatable lens barrel whose position can be moved along the z-axis becomes unnecessary.

Transparent substrate 30 can take the form, for example, of a rectangular-shaped plate that is transparent to wavelengths of light that are detectable by image sensor 26 and can be separated from lens stack 22 by a first spacer 32. Likewise, image sensor 26 can be separated from transparent substrate 30 by a second spacer 34. Each spacer 32, 34 has a respective opening 33, 35 so as not to interfere with the light passing through lens stack 22 to image sensor 26. Spacers 32, 34, which can be formed by replication or vacuum injection, 3-D printing or screen printing, also serve as part of the side walls for the camera module and can be composed, for example, of a non-transparent material, such as a polymer (e.g., black epoxy) or other material. The thickness of the first spacer 32 and/or second spacer 34 can be adjusted (e.g., by micro-machining, laser cutting or dicing) to provide focal length correction (e.g., FFL correction). Thus, one or both spacers 32, 34 also can serve as a focal length correction means.

In some implementations, the transparent substrate 30 may not be needed. In that case, the lens stack 22 can be separated from sensor 26 by a single spacer, and the focal length offset can be corrected by adjusting the thickness of the spacer. In such situations, the single spacer separating the lens stack 22 from the sensor 26 can serve as a focal length correction means.

The lenses in lens stack 22, including the largest lens 24, can be formed, for example, by injecting molding, which allows the lenses to be made in a wide range of shapes (in addition to circular) when viewed along the z-axis (i.e., the axis that is parallel to the optical axis of the lens stack and perpendicular to the surface of image sensor 26). The lenses also can be made by a wafer-level replication technique. For example, the lenses can be replicated on substrates in a circular shape and then cut (e.g., by dicing) to match the dimensions of the active array area. The lenses can be held, for example, by a lens frame 23, which can be attached to first spacer 32. These components and the various other components of camera module 20 can be attached to one another (e.g., by glue or some other adhesive) as shown in FIG. 2.

Figure 1A:
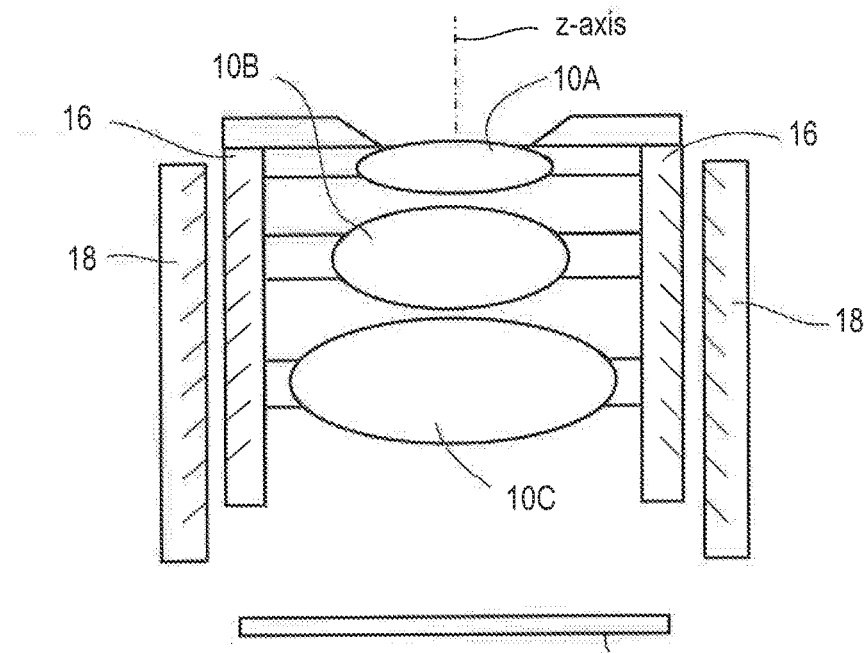
FIG. 1A illustrates an example of a side view of a camera module with a lens barrel including circular lenses.
Figure 1B:
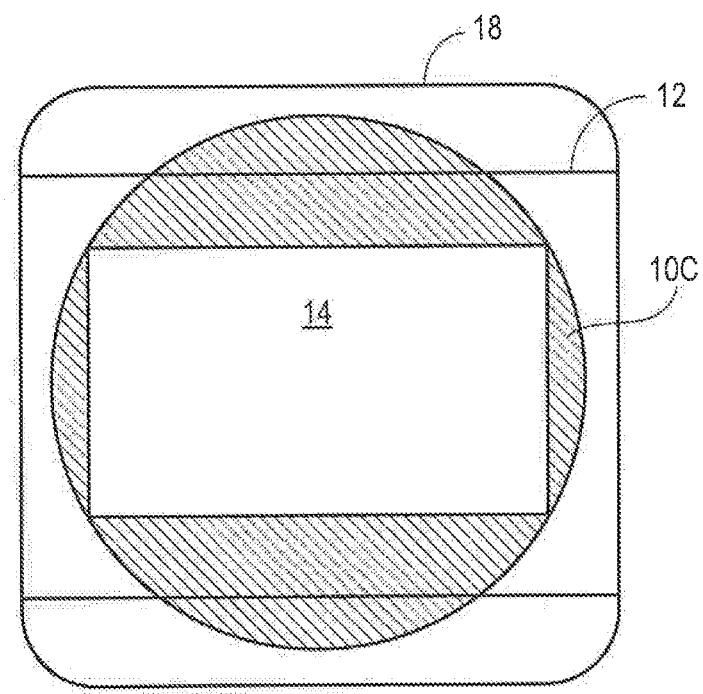
FIG. 1B is shows the shape and relative positions of certain components of the module of FIG. 1A when viewed along the z-axis.
Figure 3:
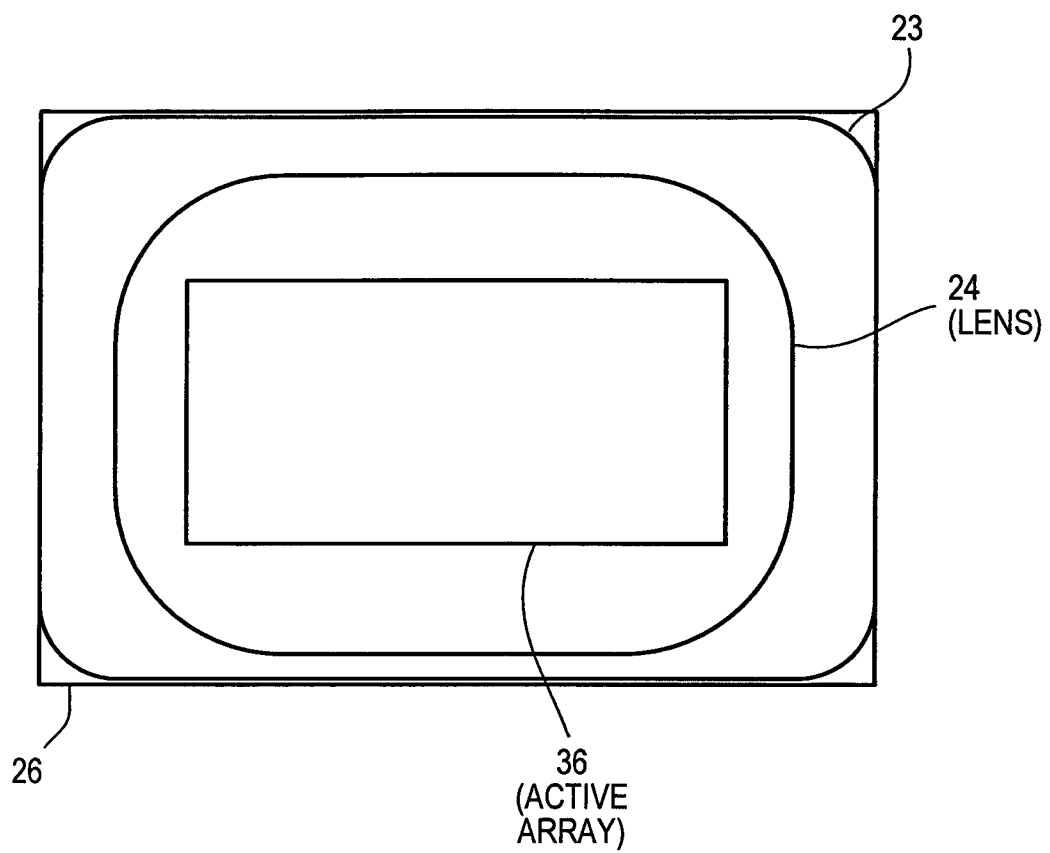
FIG. 3 illustrates relative dimensions of various components of the camera module of FIG. 2 according to some implementations.

One advantage of forming one or more of the lenses in the lens stack in a non-circular shape can be understood by comparing FIGS. 1B and 3. In general, the largest lens in the lens stack should have a diameter that is slightly larger than the active array of the image sensor. This design helps ensure that substantially all rays of interest are captured by the active array of the image sensor. The inventor has recognized, however, that (as shown in FIG. 1B) if the largest lens 10C has a circular shape and active array 14 has a rectangular shape, there can be a significant amount of wasted area of the lens (i.e., light passing through lens 10C but not falling on active array 14) (see the shaded area 19 in FIG. 1B). On the other hand, as shown in FIG. 3, lens 24 can be formed with a non-circular shape (e.g., rectangular, near-rectangular, rectangular with rounded corners, elliptical, a combination of curved portions and one or more flat sides) such that the shape of lens 24 is tailored more closely to the size of the active array portion 36 of image sensor 26. Thus, lens 24 can be shaped and sized based on the overall geometry of camera module 20 and can be made only slightly larger than active array 36 so as to ensure that most, and preferably all, of the light passing through the lens stack impinges on the active array.

Figure 3A:
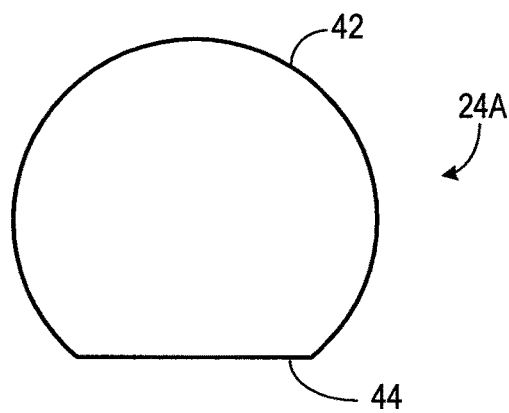
Figure 3B:
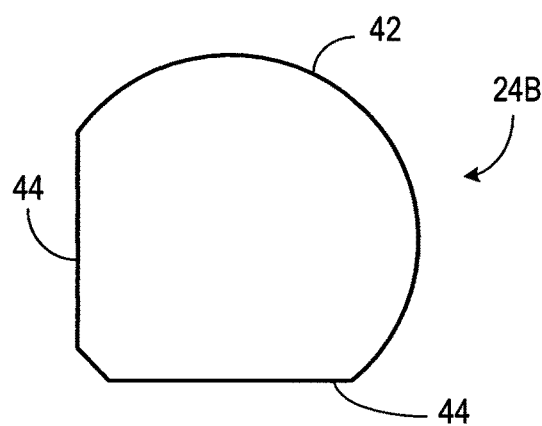
Figure 3C:
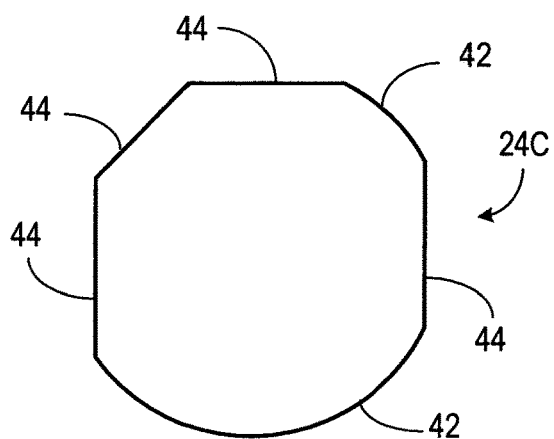

In some cases, for example, the periphery of the lens has at least one curved portion and one or more flat (i.e., straight) portions. Examples are illustrated in FIGS. 3A, 3B and 3C, each of which has at least one curved portion 42 and at least one flat portion 44. Thus, the periphery of lens 24A has one curved portion 42 and one flat portion 44; the periphery of lens 24B has two flat portions 44; and the periphery of lens 24C has more than two flat portions 44, including two flat sides that are parallel to one another. FIGS. 3D through 3G illustrate further examples of lenses each of which has a periphery that includes one or more curved portions 42 and one or more flat portions 44. Lenses having at least one flat side are advantageous in some cases because they can allow the lenses barrel for one camera to be brought closer to the lens barrel of another camera, thereby reducing the overall footprint of the imaging assembly. When non-circular lenses are used, it can be beneficial to use non-circular barrel openings for the lens barrel. FIGS. 4A through 4D illustrate top views showing the outline of several examples of lens barrels having a non-circular opening 25 combined with a non-circular lens 24. In these examples, the shape of the lens barrel opening 25 substantially corresponds to the shape of the lens 24. A barrel opening that has one or more flat sides corresponding to the shape of the lens(es) can help control or prevent stray light issues that otherwise may arise. In other instances, the lens barrel opening 25 may a non-circular shape (e.g., rectangular), but may not match the non-circular shape of the lens 24. Examples are illustrated in FIGS. 5A through 5D. In some implementations in which the periphery of the lens has a single flat side, the flat-side of the lens barrel opening is located on the opposite side from the flat side of the lens (i.e., when viewed from the top). Lenses having one or more flat sides also can be formed as part of an integrated lens array, for example, where an array of lenses is formed on a contiguous cover glass or where an array of lenses are formed as part of a single monolithic piece. Such implementations can allow the lenses in the array to be closer to one another, thereby reducing the overall footprint of the lens array.

For an image sensor with an active array having a given size, lens 24 in FIG. 3 can be made smaller than lens 10C of FIG. 1B. Thus, in some implementations, the projected area of the lens, when viewed along the z-axis, can be larger than the area of the active array region, but smaller than the area of a circle circumscribing the active array region. In general, by forming lens 24 by an injection molding technique, the cross-section of lens 24 can, in principle, be chosen to be the smallest that fits the active array 36 and the optical design of the camera module, while avoiding cutting off any light rays that are needed to focus the image onto active array 36. Likewise, in the case of wafer-level replicated lenses or polished glass lenses, the portion of the lens material that would result in wasted area can be diced off, cut away, or otherwise removed. Thus, the foregoing design can result in camera modules with very small dimensions and a very small footprint.

Figure 6:
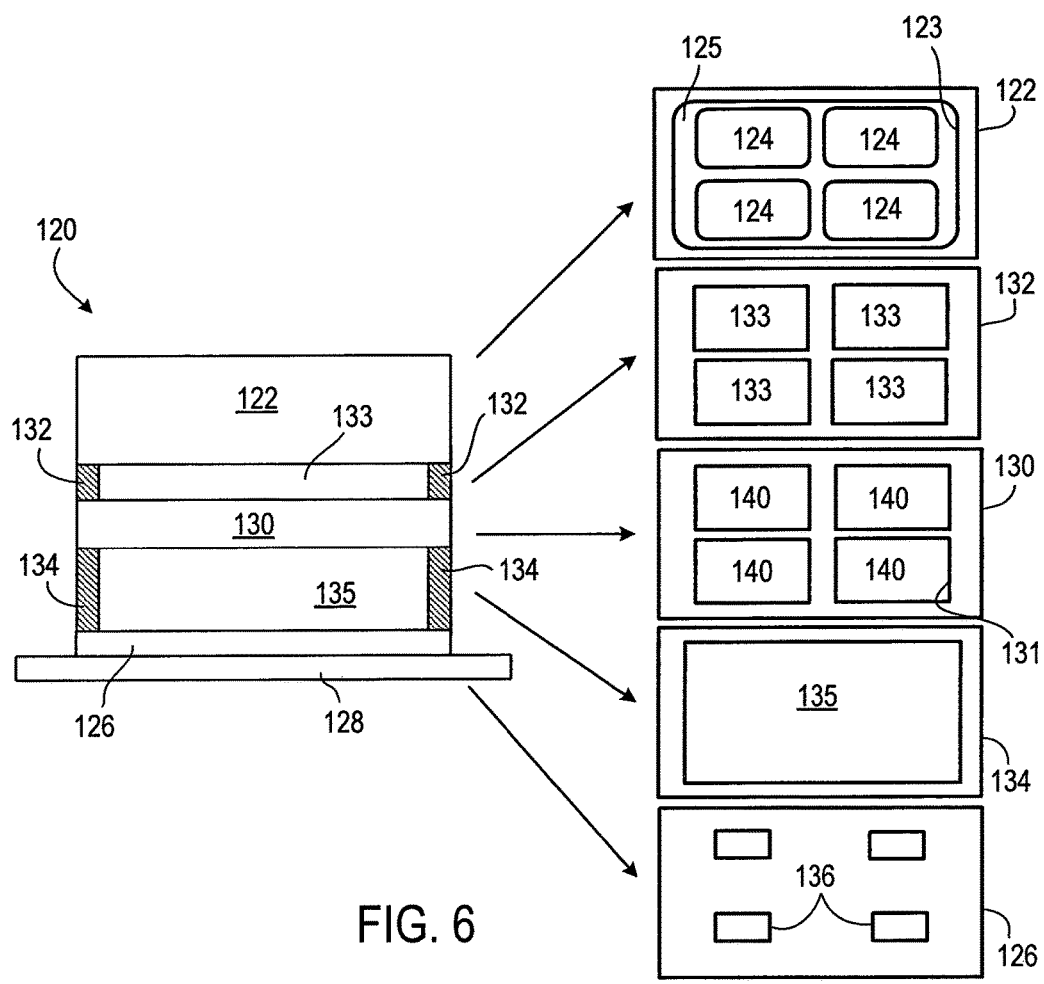
FIG. 6 illustrates an example of a camera module that includes multiple optical channels.

The example of FIG. 2 illustrates a single channel module 20. A similar construction can be used to provide multi-channel modules, such as the 2×2 array camera module 120 as shown in FIG. 6. Camera module 120 includes a lens array unit 122 that includes an integral array 125 of injection molded lenses 124 (see the right-hand side of FIG. 6, which shows top views of particular components of module 120). The injection molded array 125 can be held by a lens array frame 123. Lenses 124 can be composed, for example, of plastic or polymer material. Lens array unit 122 can be formed as a single integral injection molded piece. Alternatively, lenses 124 can be formed by wafer-level replication or as glass lenses. Prior to assembly in frame 123, the lenses are cut into the desired size and shape. Alternatively, the lenses 124 can be formed (e.g., by injection molding) to have at least a single flat side. Although only a single array 125 of lenses is illustrated in FIG. 6, module 120 can include multiple stacked arrays to address imaging requirements. The lenses can have various shapes, including non-circular (e.g., rectangular, near-rectangular, rectangular with rounded corners, elliptical). Furthermore, if multiple lens arrays are stacked one above the other, the lenses in the different arrays can have different shapes (e.g., the largest lenses can be non-circular, whereas the other lenses can be circular).

Camera module 120 also includes an image sensor 126 mounted on a printed circuit (PCB) or other substrate 128. As in the implementation of FIG. 2, image sensor 126 can be, for example, a charge coupled device (CCD) or a complementary metal oxide semiconductor transistor (CMOS). Image sensor 126 has active array portions 136, each of which is for a different optical channel.

A transparent substrate 130 is located between lens array unit 122 and sensor 126. In some implementations, the thickness of the transparent substrate 130 is in the range of about 150-450 µm. A non-transparent layer 131, composed, for example, of a black chrome or black polymer resist, can be provided on specified parts of transparent substrate 130, such as near its perimeter and, in particular, it can be used to separate the optical channels from one another. In some implementations, chrome layer 131 is deposited on the image sensor-side or on the object side of transparent substrate 130. As it is not possible to adjust the focal length of the optical channels after the module 120 is assembled, a focal length correction layer can be added for one or more of the channels based on optical measurements made during fabrication and assembly. Any channel whose focal length needs to be corrected can have the effective thickness of transparent substrate 130 adjusted by addition of a thin layer, for example, on the image sensor-side of transparent substrate. In some implementations, the thickness of the thin layer is on the order of about 25 µm. Some implementations also include a color filter 140 for each of the channels. Color filters 140, which may differ for the various channels (e.g., green, red, blue), can be provided, for example, on the side of transparent substrate 130 that is furthest from the image sensor or on the side that is closer to the sensor. This allows the various channels to be used to detect different colors (i.e., wavelengths) of light.

Transparent substrate 130 can be separated from lens array unit 122 by a first spacer 132 that is grid-shaped with openings 133 corresponding to the optical channels. First spacer 132 can be composed, for example, of a material that is substantially non-transparent to wavelengths of light detectable by image sensor 126. Thus, for example, first spacer 132 can be composed of a non-transparent polymer such as black epoxy to reduce optical noise between the channels. Spacer 132 can be formed, for example, by replication or vacuum injection, 3-D printing or screen printing.

Image sensor 126 can be separated from transparent substrate 130 by a second spacer 134, which has an opening 135 so as not to interfere with the light passing through transparent substrate 130 to image sensor 126. In some implementations, the thickness of second spacer 134 is on the order of about 150 µm. Second spacer 134 also can be composed, for example, of a non-transparent polymer material (e.g., black epoxy) that is substantially non-transparent to wavelengths of light detectable by image sensor 126. Spacer 134 also can be formed, for example, by replication or vacuum injection, 3-D printing or screen printing. The thickness of second spacer 134 can be adjusted, for example, by micro-machining, laser cutting or dicing to provide for correction to the module focal length, if required. Both spacers 132, 134 also serve as part of the side walls for the camera module. These components and the various other components of camera module 120 can be attached to one another (e.g., by glue or some other adhesive) as shown in FIG. 6. Although FIG. 6 illustrates a 2×2 lens array, more generally, the camera module can include any M×N lens array. In some cases, the size (i.e., diameter) of the lenses and the active array areas may differ from one channel to the next.

As described with respect to the implementation of FIG. 2, the transparent substrate 130 and/or spacers 132, 134 can serve as focal length correction means to facilitate adjustment of the channel and module focal lengths. Here too, by integrating focal length correction means into the array camera module, the need for a rotatable lens barrel whose position can be moved along the z-axis becomes unnecessary. In some implementations (e.g., if the deviation from the desired focal length is small), only the second spacer 134 may be needed. For example, if the lenses are made very accurately, then the focal length correction provided by the transparent substrate may not be necessary.

In the camera module of FIG. 2, the outer dimensions of the lens stack 22, the spacers 32, 34, the transparent substrate 30 and the image sensor 26 are substantially the same. Likewise, in the camera module of FIG. 6, the outer dimensions of the lens array 122, the spacers 132, 134, the transparent substrate 130 and the image sensor 126 are substantially the same. In some implementations of a camera module that includes a non-circular lens, it may be desirable to reduce the overall dimensions even further as shown, for example, in FIG. 7.

Figure 7:
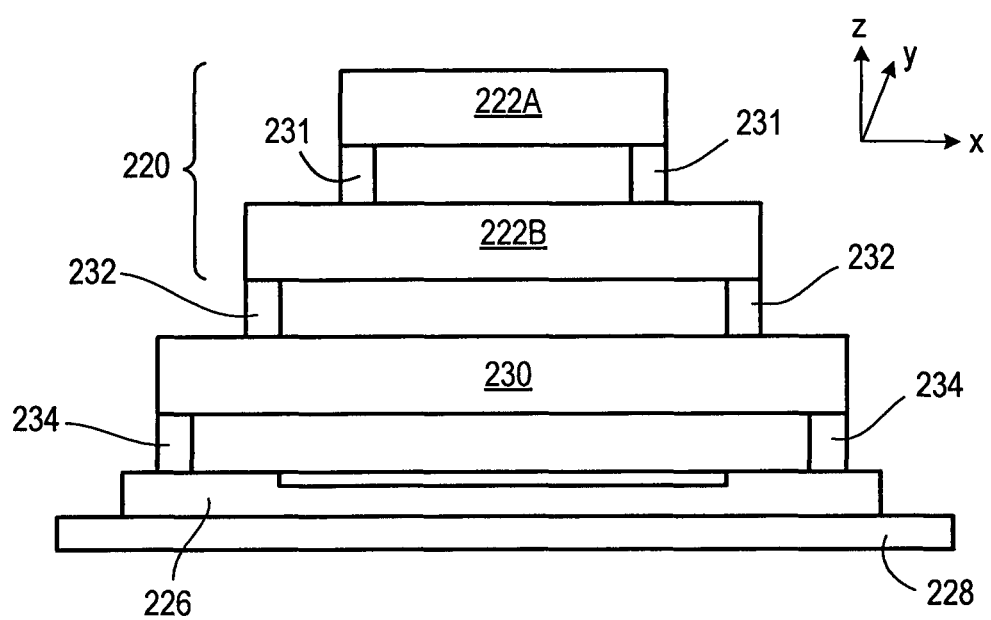
FIG. 7 illustrates another example of a camera module including a non-circular lens.

As illustrated in FIG. 7, the camera module has a vertical stack of lenses 220 including at least one non-circular lens 222B (or an array of non-circular lenses). A second lens 222A (or array of lenses) is disposed over the non-circular lens 222B and is separated from the non-circular lens by a spacer 231. As shown in FIG. 7, the horizontal dimensions of the lenses 222A, 222B (or the arrays of lenses) in the x-y directions decrease toward the top of the camera module. Thus, the second lens 222A (or lens array) has smaller x-y dimensions than the non-circular lens 222B (or array of non-circular lenses).

As further shown in FIG. 7, the lens stack 220 is disposed over a transparent substrate 230 and is separated from the transparent substrate 230 by a second spacer 232. The transparent substrate 230, in turn, is disposed over an image sensor 226 and is separated from the image sensor by a third spacer 234. The image sensor 226 is mounted on a printed circuit (PCB) or other substrate 228. As described with respect to the implementations of FIGS. 2 and 6, the transparent substrate 230 and/or spacers 232, 234 can serve as focal length correction means to facilitate adjustment of the focal length. By integrating focal length correction means into the array camera module, the need for a rotatable lens barrel whose position can be moved along the z-axis becomes unnecessary. Also, in the case of a single channel camera module, the transparent substrate 230 can be omitted, with a single spacer separating the lens stack 220 from the image sensor 226.

A camera module, such as the example of FIG. 7, which has decreasing dimensions toward the top of the module, can allow greater freedom in some cases for placing the module in an electronic device such as a mobile phone or laptop computer.

Various modifications can be made consistent with the spirit of the invention. Accordingly, other implementations are within the scope of the claims.

What is claimed is:

1. A camera module comprising:
   an image sensor having an active array region;
   a lens that has a non-symmetrical, non-circular shaped outline when viewed along an axis that passes through the lens to the active array region and that is parallel to a stacking direction of the image sensor and the lens; and
   focal length correction means that separates the lens from the image sensor.

2. The camera module of claim 1 wherein the lens has dimensions such that a projected area of the lens, when viewed along the axis, is larger than the area of the active array region.

3. The camera module of claim 2 wherein the lens has dimensions such that the projected area of the lens, when viewed along the axis, is smaller than the area of a circle circumscribing the active array region.

4. The camera module of claim 1 wherein the lens has dimensions such that substantially all light rays passing through the lens are captured by the active array of the image sensor.

5. The camera module of claim 1 including a stack of lenses, at least one of which is the lens having a non-symmetrical, non-circular shape.

6. The camera module of claim 1 wherein the focal length correction means includes a transparent substrate that is transparent to wavelengths of light that are detectable by the image sensor.

7. The camera module of claim 6 wherein the focal length correction means further includes a first spacer separating the lens from the transparent substrate, and a second spacer separating the transparent substrate form the image sensor.

8. The camera module of claim 6 wherein the transparent substrate and a frame holding the lens are fixed to one another by way of a first spacer, and wherein the transparent substrate and image sensor are fixed to one another by way of a second spacer.

9. The camera module of claim 8 wherein the first and second spacers form portions of outer sidewalls of the camera module.

10. The camera module of claim 1 wherein the focal length correction means includes a thickness-adjusted spacer that separates the lens from the image sensor.

11. The camera module of claim 1 wherein the lens having a non-symmetrical, non-circular shape is an injection molded lens.

12. The camera module of claim 1 wherein the non-symmetrical, non-circular shaped outline of the lens has two straight sides that are parallel to one another, when viewed along the axis.

13. The camera module of claim 1 wherein the lens is disposed in a lens barrel, the lens barrel having a non-circular opening.

14. The camera module of claim 13 wherein the non-circular opening of the lens barrel has a shape corresponding to a shape of the lens.

15. The camera module of claim 13 wherein the non-circular opening of the lens barrel has a non-circular shape that does not match the non-symmetrical, non-circular shaped outline of the lens.

16. The camera module of claim 13 wherein the non-symmetrical, non-circular shaped outline of the lens has a single straight edge and one or more curved edges, and the lens barrel opening has a straight side located on an opposite side from the straight edge of the lens.

* * * * *